United States Patent Office 2,738,320
Patented Mar. 13, 1956

2,738,320
PROCESS FOR PHOTOCHEMICAL CHLORINATION

Arnold N. Johnson, Passaic, N. J., and Philip E. Brumfield, Terre Haute, Ind., assignors to Commercial Solvents Corporation, Terre Haute, Ind., a corporation of Maryland No Drawing. Application March 27, 1953,
Serial No. 345,266

9 Claims. (Cl. 204—163)

Our invention relates to improvements in chlorination processes. More particularly, it relates to methods of catalyzing photochemical chlorination reactions which greatly increase the reaction rate.

The object of our invention is to decrease the period of time necessary to induce the beginning of photochemical chlorination reactions and to decrease the total period required for these reactions to go to completion. It is the further object of our invention to increase the rate of photochemical chlorination reactions without decreasing the percentages of any desirable compounds in the products formed.

A still further object of our invention is to increase the rate of photochemical chlorination reactions by means of catalysts which are required in very small catalytic quantities.

It has been found that in any chlorination reaction catalyzed by actinic light a large proportion of the total time required to complete the chlorination is devoted to inducing the beginning of the reaction. Shortening this induction periods appreciably will inevitably result in completing the full reaction in a shorter total period of time. The shorter the reaction period required the greater is the total volume of reactants which can be employed and the greater is the volume of chlorinated products which will be obtained with a fixed reactor volume. Any appreciable shortening of the total reaction time required for complete photochemical chlorination will be a distinct improvement over the present slower rates of reaction.

We have now discovered that photochemical chlorination reactions will proceed much faster when the said reactions are catalyzed by a compound selected from the group consisting of lower aliphatic alcohols, lower dialkyl simple ethers, and 1,4-dioxane. Moreover, we have found that these chlorination reactions are catalyzed by an extremely small amount of the said catalyst. Furthermore, we have discovered that such catalyzed photochemical chlorinations will result in the same percentage distribution of products as the slower chlorination carried out without these catalysts being present.

Direct photochemical chlorination as now carried out may be exemplified by the chlorination of benzene to benzene hexachloride. In carrying out this reaction the present practice is to charge purified benzene to the charging line, injecting gaseous chlorine at an intermediate point along this line before the reactor. The benzene and chlorine mixture is then conducted into glass reactor tubes within which the reaction is catalyzed by strong actinic light. Reactor tubes of sufficient length to allow the reaction to go to completion are provided with light sources for each. The reaction mixture is subjected to a caustic wash to remove excess chlorine and any hydrogen chloride formed, excess benzene distilled off, and the product recovered. Our new improved process for photochemical chlorination involves introducing into the benzene reactant before it is charged an amount of a catalyst selected from the group consisting of lower aliphatic alcohols, lower dialkyl simple ethers, and 1,4-dioxane equal to 3.0% or less of the benzene, and forming a homogenous mixture of the catalyst with the benzene. This homogenous mixture is then charged to the reaction vessel, gaseous chlorine is introduced therein in the same manner as previously, and the reaction completed.

Catalysts suitable for use in our new improved chlorination process include the lower aliphatic alcohols such as methanol, ethanol, 2-propanol and 1-butanol, lower dialkyl simple ethers such as diethyl ether, diisopropyl ether and dibutyl ether, and the cyclic diether 1,4-dioxane. The amounts of these catalysts required to give the maximum increase in the rate of reaction vary, depending upon the compound to be chlorinated, from about 0.01% to about 3.0% of the weight of the said compound. In the photochemical chlorination of benzene to benzene hexachloride we prefer to employ from 0.03 to about 1.0% of the ethyl ether or 1,4-dioxane catalysts in order to secure the greatest increase in reaction rate and to effect the greatest economy in the use of the catalyst. When the lower aliphatic alcohols are employed as catalysts it is necessary to use greater amounts to catalyze the chlorination of benzene, amounts of from about 0.5% to about 3.0% of the benzene being catalytically effective. Moreover, our evidence indicates that in the chlorination of toluene to benzyl chloride amounts of from about 0.03% to about 0.7% of the 1,4-dioxane catalyst are effective to increase the rate of reaction. Amounts of our catalysts greater than those specified do not deleteriously affect the chlorination reactions involved, but neither do such amounts appear to increase the rate of the reactions appreciably.

All compounds capable of being photochemically chlorinated at present will have the reaction time for their photochemical chlorination reduced to some extent by the inclusion of these catalysts. Some will be reduced to a greater extent than others. We have found that the photochemical chlorination of toluene to benzyl chloride proceeds at a faster rate when catalyzed by these catalysts we employ. These results, taken with those obtained upon chlorinating benzene, indicate that chlorinations by either substitution on alkyl chains or addition to aromatic rings are catalyzed by our catalysts.

We have also found an advantageous side effect of the use of our catalysts with such relatively unstable chlorinated compounds as benzyl chloride. For example we have found that benzyl chloride produced by the photochemical chlorination of toluene in the normal manner with no catalyst after 6 months in storage in glass had turned black and showed a percent of acidity as HCl of 0.42%, whereas a sample run on the same day containing approximately 0.15% of the dioxane catalyst had undergone no visible decomposition and showed an acid value of only 0.04% as HCl.

It should be reemphasized that the new chlorination-promoting effects of our catalysts have been found to be present only in those chlorination reactions which proceed slowly or sluggishly either throughout the entire chlorination or at some point in the reaction. That is to say that the catalysts employed in our new photochemical chlorination process have not been found to induce chlorination of those compounds heretofore completely unreactive to chlorine by photochemical processes. For example, nitrobenzene which normally cannot be chlorinated by photochemical methods was not affected by attempts to photochemically chlorinate with the inclusion of our catalysts. It is known that toluene may be chlorinated by means of a sodium hydroxide catalyst to methylhexachlorocyclohexane by means of addition to the benzene ring. However, photochemical chlorination of toluene results only in chlorination of the methyl side chain to benzyl chloride. This same fact is true of photochemical chlorination of toluene promoted by our catalysts. That is, only benzyl chloride is produced which results from chlorination of the methyl side chain, and no chlorination of the benzene ring occurs.

Thus it is clear that our new improvement in the processes of photochemical chlorination involves decreasing the reaction time necessary for complete chlorination of compounds which react slowly or sluggishly with chlorine, but our new process is not intended to provide photochemical chlorination for those compounds not presently able to be chlorinated in this manner. In those reactions in which the chlorination becomes increasingly more sluggish with the higher degree of chlorination of the product our new photochemical chlorination processes afford a method for reducing the reaction time necessary to complete these reactions.

Our invention is illustrated by the following examples, and it is not intended that our invention be construed as limited to the ratios, amounts or specific reactants shown therein. We intend for all equivalents of our invention which are known to those skilled in the art to be included in the scope of our invention as described in this specification and the attached claims.

EXAMPLE I

Photochemical chlorination of benzene was conducted in the laboratory by introducing reagent grade benzene with varying amounts of dioxane catalyst, the mixture making a total volume of 300 ml., into a glass tubular reactor of 2-inch diameter and 12-inch length. Chlorine was added at a fixed rate for a time of either 15 or 30 minutes, a lamp was turned on, and the time noted for the reaction to start and to finish by color changes. The results of this chlorination are set out in Table I below.

*Table I*

|  | 1 | 2 | Control | Control |
|---|---|---|---|---|
| Ml. benzene | 300 | 300 | 300 | 300 |
| Ml. dioxane | 0.3 | 0.1 | | |
| Minutes $Cl_2$* | 30 | 15 | 30 | 15 |
| Minutes to start | 1 | 3 | 8 | 8 |
| Minutes to complete | 4 | 4 | 10 | 13 |
| gm. BHC | 24.9 | 12.8 | 26.5 | 11.4 |
| Percent gamma BHC | 13.5 | 13.3 | 13.4 | 13.4 |
| Max. Temp (degrees) | 36 | 34 | 33 | 31 |

* 30 Min. $Cl_2$ = 24.7 g. $Cl_2$ by meter calibration.

It is evident from the data set forth in Table I that the induction period of the benzene photochemical chlorination reaction was reduced to approximately one-quarter of the time necessary without catalysts by the use of our 1,4-dioxane catalyst, and that the reaction went to completion in approximately one-half the period of time necessary without the catalysts. It is also evident from these data that the percent of gamma isomer of benzene hexachloride present in the product is unchanged by use of our catalyst. The reactions promoted by the 1,4-dioxane catalyst tended to be rapid and violent but were easily controlled by control of the source of actinic light.

EXAMPLE II

The following experiment was conducted to show the effect of the 1,4-dioxane catalyst on the photochemical chlorination of toluene. In this experiment reagent grade toluene was partially saturated with chlorine gas in the dark. Then, and still in the dark, 15 ml. aliquots of the solution were placed in clear glass test tubes and the indicated amount of 1,4-dioxane catalyst added. The test tubes were then placed in a beaker of water and subjected to light from a 100 watt clear light bulb at the indicated distance. The results of this experiment are set forth in Table II below.

*Table II*

A. TOLUENE CONTAINING 9.4% DISSOLVED $Cl_2$—LIGHT 18″ AWAY

| Run | Percent 1,4-dioxane | Min. to Start | Min. to Complete |
|---|---|---|---|
| 1 | 0 | 0.7 | 1.5 |
| 2 | 0.1 | 0.25 | 1.1 |

B. TOLUENE CONTAINING 9.4% DISSOLVED CHLORINE—LIGHT 32″ AWAY

| Run | Percent 1,4-dioxane | Min. to Start | Min. to Complete |
|---|---|---|---|
| 3 | 0 | 0.3 | 2.5 |
| 4 | 0.1 | 0.2 | 2.2 |

C. TOLUENE CONTAINING 7.7% DISSOLVED $Cl_2$—LIGHT 55″ AWAY

| Run | Percent 1,4-dioxane | Min. to Start | Min. to Complete |
|---|---|---|---|
| 5 | 0 | 6.7 | 8.0 |
| 6 | 0.03 | 2.5 | 6.7 |
| 7 | 0.1 | 2.0 | 6.7 |
| 8 | 0.7 | 4.0 | 7.8 |

The data set forth in Table II indicate that the inclusion of the 1,4-dioxane catalyst shortened the induction period for the photochemical chlorination of toluene by as much as one-half and the period of time necessary for the reaction to go to completion as much as one-fourth. The most effective range of concentration of the 1,4-dioxane catalyst to promote the chlorination of toluene is indicated by this experiment to be from approximately 0.03% to approximately 0.7% of the toluene chlorinated.

EXAMPLE III

The following experiment was conducted to compare the effect of photochemical chlorination of benzene with no catalyst present and with varying amounts of several catalysts present including: 1,4-dioxane, ethyl ether, methanol and ethanol. The reagent grade benzene was partially saturated with chlorine in the dark and 15 ml. aliquots withdrawn and placed in clear test tubes with the indicated amounts of catalyst. The test tubes were then immersed in water in a beaker and subjected to light from a 100 watt clear light bulb. The results of the experiment are set forth in Table III below.

*Table III*

A. BENZENE CONTAINING 5.4% DISSOLVED $Cl_2$—LIGHT 18″ AWAY

| Run | Percent catalyst | Min. to Start | Min. to Complete |
|---|---|---|---|
| 1 | 0 | 1.0 | 20 |
| 2 | 0.1 1,4-dioxane | 1.0 | 12 |
| 3 | 0.1 ethyl ether | 1.0 | 7 |

B. BENZENE CONTAINING 5.7% DISSOLVED $Cl_2$—LIGHT 18″ AWAY

| Run | Percent catalyst | Min. to Start | Min. to Complete |
|---|---|---|---|
| 4 | 0 | 2.0 | 15 |
| 5 | 0.1 1,4-dioxane | 1.8 | 10 |
| 6 | 0.1 ethyl ether | 1.9 | 8 |

C. BENZENE CONTAINING 5.7% DISSOLVED $Cl_2$—LIGHT 18″ AWAY

| Run | Percent catalyst | Min. to Start | Min. to Complete |
|---|---|---|---|
| 7 | 0 | 2.0 | 13 |
| 8 | 1.0 1,4-dioxane | 1.5 | 3.5 |
| 9 | 1.0 ethanol | 1.7 | 3.4 |
| 10 | 2.0 methanol | 1.8 | 3.4 |

D. BENZENE CONTAINING 5.7% DISSOLVED $Cl_2$—LIGHT 18″ AWAY

| Run | Percent catalyst | Min. to Start | Min. to Complete |
|---|---|---|---|
| 11 | 0 | 2.8 | 16+ |
| 12 | 1.0 ethyl ether | 2.3 | 6.5 |
| 13 | 1.0 methanol | 1.4 | 4.7 |

E. BENZENE CONTAINING 5.7% DISSOLVED $Cl_2$—LIGHT 18″ AWAY

| Run | Percent catalyst | Min. to Start | Min. to Complete |
|---|---|---|---|
| 14 | 0 | 3.0 (est.) | 21 |
| 15 | 2.0 1,4-dioxane | 1.6 | 10 |
| 16 | 2.0 ethyl ether | 1.6 | 7 |

It is evident from the results reported in Table III that 1,4-dioxane, ethyl ether, methanol, and ethanol are effective catalysts for photochemical chlorination of benzene. The promoting effect of these catalysts is effective at concentrations of from at least 0.1% to more than 2.0% of the catalyst. 1,4-dioxane and ethyl ether demonstrate effective promotion at all percentages greater than 0.1%, while methanol and ethanol are most effective at percentages of 1.0% and above.

Now having described our invention what we claim is:

1. A process for photochemical chlorination of monocyclic aromatic hydrocarbons which comprises reacting chlorine with the hydrocarbon in the presence of from 0.01% to 3.0% of a catalyst selected from the group consisting of lower aliphatic unsubstituted monohydroxy alcohols, lower dialkyl simple ethers and 1,4-dioxane in the further presence of actinic light to obtain chlorinated monocyclic aromatic hydrocarbon.

2. In the process of photochemical chlorination of monocyclic aromatic hydrocarbons to obtain chlorinated monocyclic aromatic hydrocarbons the improvement which consists in catalyzing the reaction by means of from 0.01% to 3.0% of a catalyst selected from the group consisting of lower aliphatic unsubstituted monohydroxy alcohols, lower dialkyl simple ethers, and 1,4-dioxane.

3. In the process of photochemical chlorination of benzene to obtain chlorinated benzene the improvement which consists in catalyzing the reaction by means of from 0.01% to 3.0% of a catalyst selected from the group consisting of lower aliphatic unsubstituted monohydroxy alcohols, lower dialkyl simple ethers, and 1,4-dioxane.

4. In the process of photochemical chlorination of toluene to obtain chlorinated toluene the improvement which consists in catalyzing the reaction by means of from 0.01% to 3.0% of a catalyst selected from the group consisting of lower aliphatic unsubstituted monohydroxy alcohols, lower dialkyl simple ethers, and 1,4-dioxane.

5. In the process of photochemical chlorination of benzene to obtain chlorinated benzene the improvement which consists in catalyzing the reaction by means of from 0.01% to 3.0% of 1,4-dioxane.

6. In the process of photochemical chlorination of benzene to obtain chlorinated benzene the improvement which consists in catalyzing the reaction by means of from 0.01% to 3.0% of diethyl ether.

7. In the process of photochemical chlorination of benzene to obtain chlorinated benzene the improvement which consists in catalyzing the reaction by means of from 0.5% to 3.0% of ethanol.

8. In the process of photochemical chlorination of benzene to obtain chlorinated benzene the improvement which consists in catalyzing the reaction by means of from 0.5% to 3.0% of methanol.

9. In the process of photochemical chlorination of toluene to obtain chlorinated toluene the improvement which consists in catalyzing the reaction by means of from 0.01% to 0.7% of 1,4-dioxane.

References Cited in the file of this patent

UNITED STATES PATENTS 2,393,509   Archibald et al. _____ Jan. 22, 1946

OTHER REFERENCES

Kharasch et al.: Journal of Organic Chemistry, vol. 6 (1941), pp. 810–817.